United States Patent Office 3,734,860
Patented May 22, 1973

3,734,860
CLEANING COMPOSITIONS
Jonathan L. Bowen, Niagara Falls, and Theodore H. Dexter, Lewiston, N.Y., assignors to Hooker Chemical Corporation, Niagara Falls, N.Y.
No Drawing. Filed Nov. 17, 1969, Ser. No. 877,471
Int. Cl. C11d 7/06
U.S. Cl. 252—158
16 Claims

ABSTRACT OF THE DISCLOSURE

Basic materials such as sodium or potassium hydroxide are suspended uniformly in a liquid hydrocarbon such as perchloroethylene by the addition thereto of a suspension agent selected from carboxylic acids containing from 8 to 22 carbon atoms, or metal salts or esters thereof. In combination with a water-active metal such as aluminum, such compositions find utility as drain cleaners.

---

This invention relates to cleaning compositions. More particularly, this invention relates to storage-stable basic cleaning compositions containing, as the principal active ingredient, alkali metal base, particularly suitable for effecting the removal of undesirable organic deposits and the like from the walls of drainpipes, sewers and the like.

Caustic materials, such as sodium and potassium hydroxide, in various forms have been widely used in the past for effecting the cleaning of liquid conduits such as drainpipes, sewers and the like. The caustic material employed in such applications has been made available in both solid and liquid compositions. However, for various reasons, such as those hereinafter enumerated, such prior art compositions have generally proven to be less than satisfactory in many applications.

Dry compositions, for example, used for cleaning liquid conduits such as drainpipes commonly have present, in addition to the caustic material, water-active metals such as aluminum admixed therein the form of granules, chips or shavings. The water-active metal, in conjunction with the solvating action of the caustic material, reacts in the presence of water to produce heat and to liberate hydrogen, which reaction aids in the cleaning process by providing a measure of agitation in addition to the production of heat. Frequently, additional materials have been included in such dry compositions to alter various properties, e.g., to slow down the reaction of the caustic material with organic waste material present in the conduit to be cleaned, or to make less offensive the fumes sometimes resulting upon introduction of the cleaning composition into the conduit. Directions accompanying dry caustic drain cleaners are to the effect that the caustic omposition should first be dissolved in hot water and the resulting hot water solution then added to the conduit to be cleaned. Because of the hazards apparent in handling such caustic potash and caustic soda, such a procedure is inherently dangerous. Accordingly, the general practice is to introduce the dry caustic composition directly into the liquid conduit. Partial solution of the caustic in residual water commonly present in liquid conduits such as drainpipes is accompanied by the sudden liberation of heat and fusion of the remaining caustic into a solid plug in the drainpipe. Such caustic plugs, once formed, are remarkably resistant to solution by diffusion of water into the drainpipe.

In such instances, and where feasible, it has sometimes been necessary to completely remove the caustic-plugged drainpipe or to apply external heat to the area of the plug in an attempt to liquify and remove the plug. Such plugging of a drainpipe or similar liquid conduit with caustic defeats the purpose for which the cleaner is intended.

In addition to the disadvantages hereinbefore set forth, other disadvantages in the use of dry caustic cleaning compositions are known in the art. One such disadvantage of conventional dry caustic compositions is the segregation of the components during handling, packaging and storage. It has been quite common, in the past, upon inspection of such dry caustic compositions containing, in addition to the caustic material, such materials as aluminum particles, sodium nitrate and the like, to find that the various components have segregated to a large extent. Such segregation of the components results in a non-uniformity of the cleaning compositions which adversely influences the effectiveness of the material. A further disadvantage of the dry caustic compositions is the presence of dust which is potentially harmful to the user.

Attempts to eliminate the disadvantages of dry caustic compositions by providing liquid-containing compositions have not proven entirely successful. Aqueous liquid caustic compositions, upon prolonged storage, have tended to diminish in heat-producing properties and to diminish in solvating action. Additionally, the presence of the water in such compositions precludes the addition thereto of any water-active metal, with the result, the cleaning composition cannot be packaged as a unitary cleaning composition, if the beneficial properties of the water-active metal are to be utilized.

Non-aqueous liquid caustic compositions have resulted, on storage, in separated and agglomerated mixtures such that the resulting compacted caustic mass could not be easily shaken and removed from the storage container for use. Attempts to create suspensions of caustic in such organic solvents as perchloroethylene and the like by the use of finely ground caustic, on the order of 2 to 50 microns or less, have not corrected the problem of separation and agglomeration of the caustic material. The addition of such suspension agents as silicas, resins, non-ionic and anionic surfactants has tended to thicken the mixtures, however, such mixture have not been easily shakable and pourable.

It is an object of the present invention to provide compositions adapted for prompt and effective cleaning of liquid conduits, such as drainpipes, sewers and the like.

It is a further object of the present invention to provide compositions for cleaning liquid conduits such as drainpipes, sewers and the like which may be safely used by relatively unskilled personnel, and which are safe and reliable both in usage and during lengthy storage periods.

A further object of the present invention is to provide cleaning compositions which do not separate, agglomerate or dust either during storage or during usage.

Still a further object of the present invention is to provide a novel process for preparing such novel cleaning compositions.

These and other objects and advantages will become readily apparent from the description of the invention detailed hereinafter.

It is to be understood that while the detailed description of the invention which follows relates to the use of the cleaning compositions hereinafter described in the cleaning of drainpipes and other like liquid conduits, such compositions may also find utility in the stripping of paints, oil well cleaning and the like.

In essence, the present invention contemplates a novel, non-aqueous caustic cleaning composition particularly suitable for use in removing the foreign matter, commonly referred to as sludge, which develops on the walls of drainpipes, sewers and other liquid conduits, accumulating and building up during usage to a thickness which will materially impede liquid flow and ultimately block same unless appropriate, timely and periodical efforts are made to effect removal of such deposits. The so-called sludge is comprised primarily of organic matter such as greases, oils and other hydrocarbons which are essentially non-water soluble. The necessity for inhibiting the development of such accumulations for other than effecting or restoring liquid flow is of extreme importance wherein the particular conduit is designed to be utilized for such as heat exchange or purposes other than drainage.

In accordance with the present invention, it has been found that a composition which comprises:

(a) An alkali metal base in finely divided form;
(b) A liquid hydrocarbon; and
(c) A suspension agent selected from the group consisting of monocarboxylic acids having from about 12 to about 22 carbon atoms, metal salts of monocarboxylic acids having from about 12 to about 22 carbon atoms, alkyl esters of monocarboxylic acids having from about 12 to about 22 carbon atoms, metal salts of naphthenic acid and metal salts of 2-ethylhexanoic acid, provides a basic cleaning composition which does not separate or agglomerate during either prolonged storage or during usage.

In formulating the novel compositions of the present invention, a relatively substantial range of proportions is available in order that varying intensities of reaction may be provided. Generally, it has been found that excellent cleaning compositions are those containing from about 10 to about 50 percent by weight alkali metal base, from about 49 to about 89 percent by weight of the liquid hyrdocarbon, from about 0.05 to about 10 percent by weight of the suspension agent and from about zero to about 10 percent by weight of optional ingredients, if desired. Preferably, the cleaning compositions of the present invention contain from about 20 to about 40 percent by weight of alkali metal base, from about 60 to about 80 percent by weight of the liquid carbon, from about 0.3 to about 3.0 percent by weight suspension agent, and from about zero to about 2 percent by weight of optional ingredients.

It has been found, generally, that, compositions having a viscosity of less than about 10,000 centipoises exhibit the property of a relatively high degree of flowability which enhances the value of such compositions as drain cleaners. Generally, compositions having a viscosity of from about 100 to about 1000 centipoises are suitable for the purposes of this invention, which compositions with a viscosity of less than about 20 centipoises have sometimes been found to present problems.

The term "alkali metal base" as used in the description of this invention is meant to include the basic compounds of sodium, potassium, lithium, rubidium and the like, including the hydroxides, oxides and their equivalents. The alkali metal hydroxides are generally preferred and, because of low cost and ready availability, sodium hydroxide is the preferred basic ingredient of the present compositions, and the examples hereinafter set forth are so directed.

The liquid hydrocarbon constitutent of the compositions is a normally liquid hydrocarbon having a boiling point of greater than about 40° C., and non-reactive with respect to the other constituents of the composition. While a wide variety of liquid hydrocarbons may be employed, such as kerosine and the like, it is preferred to use liquid halogenated hydrocarbons, generally having from 1 to about 3 carbon atoms. Exemplary of such liquid halogenated hydrocarbons are chlorinated hydrocarbons, such as carbon tetrachloride, perchloroethylene and the like. Preferably, perchloroethylene is used in the preparation of the basic cleaning compositions of the present invention. Perchloroethylene, an unsaturated liquid chlorinated hydrocarbon, is also known as tetrachloroethyelne, and is a colorless liquid boiling at 121° C. Among the liquid hydrocarbons, perchloroethylene is preferred in the practice of the present invention since it is non-flammable and has a low toxicity. Chlorinated hydrocarbons such as trichloroethylene and 1,1,1-trichloroethane should be avoided in the practice of this invention since such compounds are readily dehydrochlorinated on mixing with alkali metal bases and form explosive acetylenic-type compounds.

It is to be understood that the practice of the present invention admits to the use of mixtures of suitable liquid hydrocarbons.

The suspension agent employed in the cleaning compositions of the present invention is, as has hereinbefore been stated, selected from monocarboxylic acids having from about 12 to about 22 carbon atoms, metal salts of monocarboxylic acids having from about 12 to about 22 carbon atoms, alkyl esters of monocarboxylic acids having from about 12 to 22 carbon atoms, metal salts of naphthenic acid, and metal salts of 2-ethyl-hexanoic acid.

Exemplary of suitable metals which may be employed in producing organic acid salts finding utility as suspension agents in the compositions of the present invention are the Group Ia metals, such as sodium, potassium and the like. Group Ib metals such as copper and the like; Group IIa metals, such as magnesium, calcium, barium and the like; Group IIb metals, such as zinc and the like; Group IIIa metals, such as aluminum and the like; Group IVa metals, such as zirconium and the like; Group VIIa metals, such as manganese and the like; and Group VIII metals, such as iron, nickel, cobalt and the like. In many chemical applications, the properties of the ammonium radical render this chemical radical equivalent to the Group Ia metals. For the purpose of the present invention, the ammonium radical is considered as equivalent to the Group Ia metals and is included therein.

The organic acids which may be employed as the suspension agents in producing the cleaning compositions of the present invention are those organic acids generally having from about 12 to about 22 carbon atoms. Such acids may be employed either as the free acids, as metal salts using as the metal one of the metals hereinbefore specified, or as alkyl esters. Exemplary of suitable acids are stearic acid, linoleic acid, palmitic acid, oleic acid and the like. Metal salts which may be used include such salts as calcium stearate, zinc stearate, aluminum stearate, calcium linoleate, calcium palmitate and calcium oleate and mixtures thereof are exemplary of suitable organic acid salts which may be used as the suspension agents in the compositions of the present invention.

In those instances wherein alkyl esters are employed as suspension agents, it is preferred that the esters of monocarboxylic acids contain alcoholic moieties generally having from one to about 5 carbon atoms. Exemplary of such monocarboxylc acid esters are methyl stearate, butyl oleate, ethyl linoleate and the like.

Additionally, metal salts of naphthenic acid and 2-ethylhexanoic acid have been found to be suitable for use as suspension agents in the cleaning compositions. Exemplary of suitable metal naphthenates and metal 2-ethylhexanates which may be used are calcium naphthenate, aluminum naphthenate, zinc naphthenate, calcium 2-ethylhexanate, aluminum 2-ethylhexanate, zinc 2-ethylhexanate and the like.

Preferably, the suspension agent is a monocarboxylic acid having at least about 12 carbon atoms, or an ester or metal salt thereof. Calcium stearate is most preferred for use as the suspension agent in the basic cleaning compositions of the present invention.

The basic cleaning compositions may include, in addition to the alkali metal base, the liquid hydrocarbon and the suspension agent, such additional ingredients as may further the desired action of the composition, either to increase the production of heat, or to provide a measure of agitation, or for other purposes incidental to the use for which the composition is designed. For instance, a water-active metal such as aluminum metal in the form of finely divided granules, chips or flakes may be added to the composition, which water-active metal reacts upon contact with water and caustic to provide, among other things, a measure of agitation. Reagents, optionally, designed to increase the reactivity of the caustic and the water-active metal, if present, may be included in the composition. Such reagents include alkali metal chlorites, alkali metal nitrates and the like. Other materials including inorganic compounds such as sodium borate, sodium chloride, sodium chromate, manganese sulfate and the like may be incorporated in the composition, providing that such materials are in a form rendering them easily suspendable or soluble in the basic composition. Other materials, such as perfuming agents, e.g. powdered spices such as ginger, cinnamon, cloves and the like, may optionally be added to the basic composition in suspendable or soluble form, where desired. Sodium chloride, sulfate and silicate are useful in basic cleaning compositions for controlling the intensity of the reaction with water, while the inclusion of metal chromates or manganese sulfate may be utilized to impart a desirable color to the basic composition.

The water-active metal which may be employed in the basic cleaning compositions is preferably aluminum. Where aluminum or another water-active metal is used, it is preferred that the particles be of a very small size, such as those passing readily through a 20 mesh or finer sieve, since such particles may easily be suspended with the alkali metal base in the liquid hydrocarbon. Additionally, aluminum particles of a generally homogeneous or similar size range are particularly preferred over, for example, chips or shavings which may generally conform to size dimensions, but which are not uniform in size. Generally, it is preferred that the aluminum not be too finely divided. Too finely divided aluminum may tend to react too rapidly with the alkali metal base in the presence of water, tending to foam excessively. Further, too finely divided aluminum may exhibit a tendency to float.

The aluminum need not be in pure form. For example, aluminum of about 90 percent purity may be used. Portions of the aluminum may be replaced by aluminum dross, containing 50 to 60 percent aluminum, or aluminum alloys in amounts of about 10 percent or less. Suitable aluminum alloys include aluminum-magnesium alloys. Alternately, mixtures of aluminum and magnesium metals may be used.

Generally, in formulating the novel basic cleaning compositions of the present invention, and to attain maximum efficiency of such compositions, the water content of the compositions should not be greater than about 5 percent by weight. Preferably, the water content of the compositions is maintained at less than about 1 percent by weight.

It has been found that the particle size of the alkali metal base of the compositions is important in the production of suspensions which remain storage-stable for extended periods of time. Generally, in order to attain maximum suspension, it has been that the particle size should be less than about 1000 microns, with particle sizes within the range of about 0.1 to 500 microns being preferred. Attempts to produce stable suspensions with sodium hydroxide particles generally having a particle size of greater than about 1000 microns have resulted in loss of suspension and poor pouring properties.

The alkali metal-base-containing compositions of the present invention may be prepared by any suitable procedure which will produce particles of 1000 microns or less. However, it has been further found that a particularly effective method of producing extremely reliable storage-stable suspensions is one wherein the alkali metal base, in flake or pellet form, is added to the liquid hydrocarbon and the mixture then subjected to the shearing action of a high speed stirrer such as a Kady mill for a period of time sufficient to reduce the alkali metal base to an average particle size of less than about 1000 microns. The liquid hydrocarbon may be employed initially in such a grinding procedure in an amount equal to or less than that amount required to produce the final composition. For the purpose of the present process, it is preferred that the liquid hydrocarbon employed during the grinding step approximate the amount of liquid hydrocarbon present in the final composition.

The suspension agent, and the optional additives such as the water-active metal, may be added to the initial mixture prior to the grinding step, or may be added following the grinding step, provided that sufficient mixing is employed to provide an essentially homogeneous composition.

Mixing of the ingredients may be generally carried out at room temperatures, although higher or lower temperatures may be employed; for example, mixing may be effected at temperatures on the order of from about zero to up to about the boiling point of the most volatile ingredient. Preferably, the temperature during the mixing of the ingredients is maintained at about 25° C.

The following examples, in which parts and percentages are by weight, and temperatures are in degrees centigrade, serve to illustrate the present invention.

EXAMPLE 1

A mixture containing 31.8 percent by weight flake sodium hydroxide, 67.7 percent by weight perchloroethylene and 0.5 percent by weight calcium stearate was subjected to the shearing action of a Kady mill for a period of 15 minutes at a temperature of about 25° C. The product was a viscous, nearly colorless suspension, and the sodium hydroxide had a particle size of less than 500 microns. Following a storage period of three months, the finely divided sodium hydroxide remained in suspension and the suspension could be easily and completely poured from the storage container. The composition exhibited excellent cleaning properties when used to clean drains clogged with water-insoluble organic matter.

EXAMPLE 2

A mixture containing 31.8 percent by weight flake sodium hydroxide, 67.7 percent by weight perchloroethylene and 0.5 percent by weight stearic acid was subjected to the shearing action of a Kady mill for a period of 15 minutes at a temperature of about 25° C. The product was a viscous, nearly colorless suspension, and the sodium hydroxide had an average particle size of less than about 500 microns. Following a period of storage of three months, the sodium hydroxide remained in suspension and the suspension could be easily and completely poured from the storage container. The composition exhibited excellent cleaning properties when used to clean drainpipes.

EXAMPLE 3

A mixture containing 67.7 percent by weight perchloroethylene, 0.5 percent by weight zinc stearate and 31.8 percent by weight flake sodium hydroxide was subjected to the shearing action of a Kady mill for a period of 15 minutes at a temperature of about 25° C. The product was a viscous stable suspension, and the sodium hydroxide had a particle size of less than about 500 microns. Following a three month period of storage, the sodium hydroxide remained in suspension, and the suspension could be easily and completely poured from the storage container. The composition exhibited excellent cleaning properties when used to clean drainpipes.

EXAMPLE 4

A mixture containing 31.8 percent by weight flake sodium hydroxide, 67.7 percent by weight perchloroethylene, 0.375 percent by weight calcium stearate and 0.125 percent by weight aluminum stearate was subjected to the shearing action of a Kady mill for a period of 15 minutes at a temperature of about 25° C. Similar results were obtained as in Example 2.

EXAMPLE 5

A mixture containing 31.8 percent by weight flake sodium hydroxide, 67.7 percent by weight perchloroethylene and 0.5 percent by weight calcium stearate was treated in accordance with the procedure of Example 2. Following the grinding, sufficient finely ground aluminum metal was added to produce a composition containing 0.6 percent by weight aluminum. The composition was thoroughly mixed and the homogeneous suspension was stored at room temperature. Following a storage period of three months, the suspension could be poured easily and completely from the storage container. Excellent draincleaning properties were exhibited by this composition.

EXAMPLE 6

A mixture containing 10 percent by weight flake sodium hydroxide, 89.5 percent by weight perchloroethylene and 0.5 percent by weight calcium stearate was treated in accordance with the procedure of Example 1. Following a storage period of three months, the stable suspension could be poured easily and completely from the storage container.

EXAMPLE 7

A mixture containing 20 percent by weight flake sodium hydroxide, 79.5 percent by weight perchloroethylene, and 0.5 percent by weight calcium stearate was treated in accordance with the procedure of Example 1. Following a storage period of three months, the stable suspension could be easily and completely poured from the storage container.

EXAMPLE 8

A mixture containing 25 percent by weight flake sodium hydroxide, 74.5 percent by weight perchloroethylene, and 0.5 percent by weight calcium stearate was treated in cordance with the procedure of Example 1 and similar results were obtained.

EXAMPLE 9

A mixture containing 30 percent by weight flake sodium hydroxide, 69.5 percent by weight perchloroethylene and 0.5 perecnt by weight calcium stearate was treated in accordance with the procedure of Example 1 to obtain similar results.

EXAMPLE 10

A mixture containing 40 percent by weight flake sodium hydroxide, 59.5 percent by weight perchloroethylene and 0.5 percent by weight calcium hydroxide was treated in accordance with the procedure of Example 1. Similar results were obtained as in Example 1.

Similar compositions were formulated as in Examples 1–10 with the exception that the suspension agent, calcium stearate, was varied from 0.05 to 4.5 percent by weight and the sodium hydroxide varied from 10 to 40 percent by weight, with the remainder of each composition being perchloroethylene. The compositions were treated in accordance with the procedure of Example 1, and similar results obtained as in Example 1.

Cleaning compositions having the same general, desirable properties as those exhibited in Examples 1–10 may be formulated following procedures such as that detailed in Example 1, using such alkali metal base as potassium hydroxide and the like, liquid hydrocarbons such as carbon tetrachloride and the like, and such suspension agents as sodium oleate, glycerol monostearate, sodium palmitate, and the like, in proportions hereinbefore set forth.

Methods other than that given by way of example may be used to formulate the cleaning compositions of the present invention. For example, the alkali metal base and the liquid hydrocarbon may be subjected to grinding in a ball mill, or the like. However, it has been found that the use of a Kady mill or like high speed mill is particularly effective in producing excellent storage-stable cleaning compositions, and the use of such mills is preferred.

In practice, a composition prepared in accordance with the foregoing is discharged into a liquid conduit to be cleaned. The reaction between the alkali metal base and the organic matter or sludge to be removed is rapid and complete removal of the organic matter effected, generally, within a short period of time.

It is to be understood that changes, in the methods, compositions, percentages and combinations set forth may be made without departing from the spirit and scope of the present invention.

What is claimed is:

1. A storage-stable non-aqueous alkali metal base composition consisting essentially of a stable suspension of from about 10 to about 50 percent by weight alkali metal base having an average particle size of less than about 1000 microns; from about 49 to about 89 percent by weight of a normally liquid perhalogenated hydrocarbon selected from the group consisting of carbon tetrachloride and perchloroethylene and from about 0.05 to about 10 percent by weight of a suspension agent selected from the group consisting of unsubstituted monocarboxylic acids having from about 12 to about 22 carbon atoms, metal salts of unsubstituted monocarboxylic acids having from about 12 to about 22 carbon atoms, alkyl esters of unsubstituted monocarboxylic acids having from about 12 to about 22 carbon atoms, metal salts of naphthenic acid, metal salts of 2-ethylhexanoic acid, and mixtures thereof, said composition having a viscosity of from about 100 to about 10,000 centipoises at ambient temperatures.

2. A composition as defined by claim 1 wherein the suspension agent is calcium stearate.

3. A composition as defined by claim 1 in which there is also included from about 1 to about 5 percent by weight of aluminum metal particles.

4. A composition as defined by claim 1 wherein the alkali metal base is sodium hydroxide.

5. A composition as defined by claim 1 wherein the liquid hydrocarbon is perchloroethylene.

6. A storage-stable non-aqueous suspension consisting essentially of from about 10 to about 40 percent by weight of sodium hydroxide having a particle size of less than about 1000 microns, from about 49 to about 89 percent by weight of perchloroethylene and from about 0.05 to about 10 percent by weight of calcium stearate.

7. A method for removing organic foreign matter from liquid conduits which comprises introducing into said conduit a non-aqueous alkali metal base composition consisting essentially of a stable suspension of from about 10 to about 50 percent by weight alkali metal base having an average particle size of less than about 1000 microns, from about 49 to about 89 percent by weight of a normally liquid perhalogenated hydrocarbon selected from the group consisting of carbon tetrachloride and perchloroethylene, and from about 0.05 to about 10 percent by weight of a suspension agent selected from the group consisting of unsubstituted monocarboxylic acids having from about 12 to about 22 carbon atoms, alkyl esters of unsubstituted monocarboxylic acids having from about 12 to about 22 carbon atoms, metal salts of naphthenic acid, metal salts of 2-ethylhexanoic acid, and mixtures thereof, said composition having a viscosity of from about 100 to about 10,000 centipoises at ambient temperatures;

retaining said composition in contact with said organic foreign matter for a period sufficient to effect reaction therewith, and thereafter removing the materials from said conduit.

8. A method as defined by claim 7 wherein the suspension agent is calcium stearate.

9. A method as defined by claim 7 in which there is also included in the alkali metal base composition from about 1 to about 5 percent by weight of aluminum metal particles.

10. A method as defined by claim 7 wherein the alkali-metal base is sodium hydroxide.

11. A method as defined by claim 7 wherein the liquid hydrocarbon is perchloroethylene.

12. A method for preparing a storage-stable basic suspension composition suitable for use as a drain cleaner which comprises admixing from about 10 to about 50 percent by weight of an alkali metal base, from about 49 to about 89 percent by weight of a normally liquid perhalogenated hydrocarbon selected from the group consisting of carbon tetrachloride and perchloroethylene, and from about 0.05 to about 10 percent by weight of a suspension agent selected from the group consisting of unsubstituted monocarboxylic acids having from about 12 to about 22 carbon atoms, metal salts of unsubstituted monocarboxylic acids having from about 12 to about 22 carbon atoms, alkyl esters of unsubstituted monocarboxylic acids having from about 12 to about 22 carbon atoms, metal salts of naphthenic acid, metal salts of 2-ethylhexanoic acid, and mixtures thereof; and subjecting the resulting mixture to a shearing force for a period sufficient to reduce the alkali metal base to an average particle size of less than about 1000 microns.

13. A method as defined by claim 12 wherein the suspension agent is calcium stearate.

14. A method as defined by claim 13 wherein there is also included in the basic composition from about 1 to about 5 percent by weight of aluminum metal particles.

15. A method as defined by claim 13 wherein the alkali metal base is sodium hydroxide.

16. A method as defined by claim 13 wherein the liquid hydrocarbon is perchloroethylene.

References Cited

UNITED STATES PATENTS

| | | | |
|---|---|---|---|
| 860,768 | 7/1907 | Stiefel | 252—158 |
| 2,169,344 | 8/1939 | Kimball | 252—157 X |
| 2,773,040 | 12/1956 | Walton | 252—157 |
| 2,997,444 | 8/1961 | Mortin | 252—156 |
| 3,060,125 | 10/1962 | Sims | 252—153 |
| 3,357,923 | 12/1967 | Wool et al. | 252—157 |
| 3,168,477 | 2/1965 | Swanson et al. | 252—158 X |
| 3,576,751 | 4/1971 | Noznick et al. | 252—158 X |

OTHER REFERENCES

Rose et al.: The Condensed Chemical Dictionary, Reinhold Publishing Corp., New York, 1966, p. 169.

MAYER WEINBLATT, Primary Examiner

U.S. Cl. X.R.

44—3; 252—156, 157, 159, 162, 163, 165